(12) United States Patent
Kejriwal et al.

(10) Patent No.: US 8,789,178 B2
(45) Date of Patent: Jul. 22, 2014

(54) METHOD FOR DETECTING MALICIOUS JAVASCRIPT

(75) Inventors: Nidhi Govindram Kejriwal, Atlanta, GA (US); Paul Judge, Atlanta, GA (US)

(73) Assignee: Barracuda Networks, Inc., Campbell, CA (US)

( * ) Notice: Subject to any disclaimer, the term of this patent is extended or adjusted under 35 U.S.C. 154(b) by 0 days.

(21) Appl. No.: 13/152,269

(22) Filed: Jun. 3, 2011

(65) Prior Publication Data
US 2011/0289582 A1 Nov. 24, 2011

Related U.S. Application Data

(63) Continuation-in-part of application No. 12/849,721, filed on Aug. 3, 2010.

(60) Provisional application No. 61/273,334, filed on Aug. 3, 2009.

(51) Int. Cl.
*G06F 12/14* (2006.01)
*H04L 29/06* (2006.01)

(52) U.S. Cl.
CPC .................................... *H04L 63/14* (2013.01)
USPC ........................................................ 726/22

(58) Field of Classification Search
CPC .. H04L 63/14; H04L 63/1433; H04L 63/1491
USPC ..................................................... 726/22, 25
See application file for complete search history.

(56) References Cited

U.S. PATENT DOCUMENTS

2006/0253458 A1* 11/2006 Dixon et al. ..................... 707/10
2009/0300764 A1* 12/2009 Freeman ......................... 726/24

* cited by examiner

*Primary Examiner* — Ellen Tran
(74) *Attorney, Agent, or Firm* — Duane Morris LLP

(57) ABSTRACT

An apparatus and system for scoring and grading websites and method of operation. An apparatus receives one or more Uniform Resource Identifiers (URI), requests and receives a resource such as a webpage, and observes the behaviors of an enhanced browser emulator as controlled by javascript provided by the webpage. The enhanced browser emulator tracks behaviors which when aggregated imply malicious intent.

20 Claims, 9 Drawing Sheets

METHOD FOR DETECTING MALICIOUS JAVASCRIPT

RELATED APPLICATIONS

This application is a continuation in part of U.S. non-provisional patent application Ser. No. 12/849,721 filed Aug. 3, 2010 by Nidhi Govindram Kejriwal "METHOD FOR DETECTING MALICIOUS JAVASCRIPT" which is incorporated by reference in its entirety. This application claims the priority of Ser. No. 12/849,721 and is assigned to the same assignee. A related application is provisional application 61/273,334 filed Aug. 3, 2009 Web Security Systems and Methods which is incorporated in its entirety by reference.

BACKGROUND

It is the observation of the applicant that most malicious web-based activity involves javascript. Detecting and blocking malicious javascript is essential for preventing web-based compromises. Most malicious javascript is obfuscated, which renders static analysis, such as signature matching, approaches ineffective.

Legitimate javascript is also obfuscated to protect business intellectual property and enhance security so simply identifying obfuscation is insufficient. Too many false negative false positive fails. What is needed is a system to detect and prevent browser based malicious javascript contents and identify websites that attempt to download malicious javascripts.

BRIEF DESCRIPTION OF FIGURES

The appended claims set forth the features of the invention with particularity. The invention, together with its advantages, may be best understood from the following detailed description taken in conjunction with the accompanying drawings of which:

SUMMARY OF THE INVENTION

Figure 1:
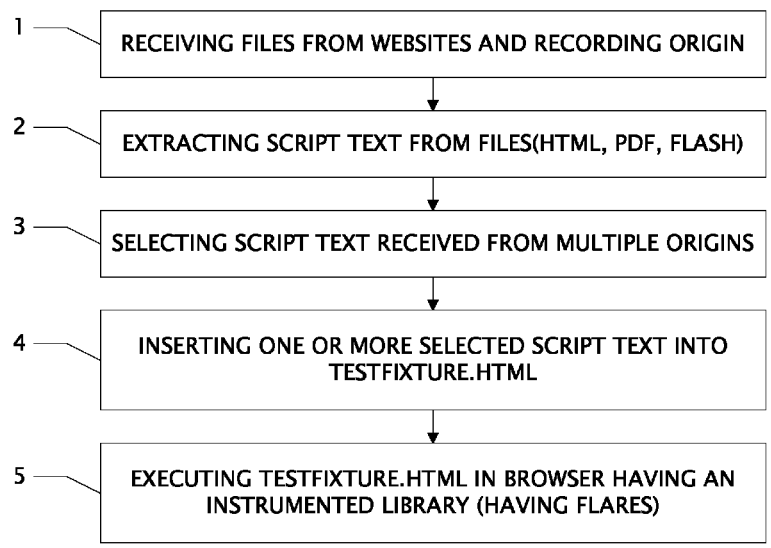
FIGS. 1-8 are flow charts illustrating a method for controlling a processor configured to intercept, analyze the behavior of, and score websites for delivery of malicious javascript

One aspect of the invention is an apparatus and system for scoring and grading websites and method of operation. An apparatus receives one or more Uniform Resource Identifiers (URIs), requests and receives a resource such as web page, and observes the behaviors of an enhanced browser emulator as controlled by javascript within the web page. Scores are earned for behaviors such as stealing cookies, dynamic generation of targets which are substantially different from the URI the web page was received from, preparing strings which may overload buffers and manipulate memory management, and insert shellcode as inappropriate arguments to functions. A related application discloses a method for identifying shell code.

DETAILED DISCLOSURE OF EMBODIMENTS OF THE INVENTION

A system is disclosed to score and grade websites by observation of script behaviors in a browser emulator. The system includes:

one or more virtual machines on a computing system comprising a processor configured by an operating system;

a communications link for each virtual machine to access hosts coupled to the Internet; and within a virtual machine, an enhanced browser emulator application wherein said enhanced browser comprises at least one enhanced script function.

The browser emulator has been enhanced by replacing standard api's, libraries, and functions with instrumented equivalents. The equivalent operations also check the number of invocations of the function against a threshold and take action upon reaching the threshold. The functions are further enhanced to examine the attributes of the function and determine if the attributes require evaluation. If a script uses functions as the arguments of other functions through several layers it adds to the negative score of the website. More serious negativity occurs when instructions determine that a target is not substantially similar to the website from which the script was received. This suggests that code is being requested from or information is being sent to a host with hostile intent.

The method for scoring and grading websites by observation of script behaviors in a browser emulator, comprises: providing such an apparatus as above. The enhanced browser emulator application has some enhanced script functions which flag when they are invoked, write details to the log and self analyze the result of their execution.

By receiving a Uniform Resource Identifier (URI) for a website for which the content is to be graded for hostile intent, the enhanced browser is aware of a normal target i.e. a fully qualified domain name.

Upon sending the URI, the enhanced browser receives a resource, typically a webpage or other file. A related application can determine if shell code is contained within said resource or is generated as the result of operating javascript on the resource. Flash byte code may also be contained in a resource.

Since javascript can execute in the browser without user activity, we rely on the instrumented function calls with enhanced visibility and analysis of its arguments, attributes, and results. Inferences are made on the behaviors as controlled by said javascript code contained within said resource. Each behavior has a negativity score which may be summed to quantify the likelihood of hostile intent.

An enhancement of the invention extracts byte code or javascript code from a pdf file or a flash file.

Some examples of behaviors that earn negative score include:

dynamically changing the location URL of the resource to force a reload of the browser with content from a host not substantially similar to the domain name of the website;

attempting to get a cookie and transmit said cookie to a target;

determining that said target is a host not substantially similar to the domain name of the website;

determining that said target is a host on a list of malicious hosts;

determining that said target is expressed in a further javascript function which requires a browser execution to resolve;

requiring a javascript element to dynamically generate an attribute of an other javascript element;

invoking the "document.write" element to operate on an argument which is substantially similar to a target wherein a target contains a domain name or an Internet Protocol (IP) address;

wherein the resource comprises a webpage, and inserting an iframe into the webpage;

dynamically generating a target for the iframe;

operating an eval function on an argument which is resolved into shell code;

operating a "document.write" function on an argument which is resolved into shell code;

operating a createElements function enough times to exceed a threshold whereby memory manipulation can be exploited;

operating a concatentation function enough times to exceed a threshold whereby memory manipulation can be exploited, or operating a javascript sequence previously determined to be malicious.

After operating the browser emulator according to a timer, an assessment can be made by computing a total score for a website from the scores of the behaviors of javascript within a browser emulator, and determining a grade for the website by comparing the total score to one or more thresholds.

The method comprises emulating html response in an enhanced browser environment that traces sensitive data access and dangerous function usage. The process includes performing behavioral analysis of javascript to determine its intentions, such as:

cookie theft i.e. alert when cookie from one site sent to another examine actions of new javascript when written to a page:

how many createElement calls, and check for presence of unicode-encoded shell code.

A method provides Dynamic Analysis comprising tracing javascript used to either inject malicious javascript in html response or redirect user to the website that is serving malicious contents.

The method of Dynamic Analysis further comprises the steps emulating the response received for client request where use of sensitive javascript functions is traced and argument to those function are analyzed for malicious contents.

Tracing is achieved by hooking and changing the implementation of those functions.

In an embodiment, providing a browser emulation environment comprising Rhino and HtmlUnit, known in the art and the following steps:

The steps include receiving a user http request, examining and forwarding the request to cloud, receiving an embedded javascript response from the cloud, receiving an embedded javascript request if any from the cloud, forwarding the analyzed response if no malicious javascript, and blocking message to the user if malicious javascript found.

The method categorizes vulnerabilities into at least one of the following:

a. create element
b. suspicious iframe
c. block iframe
d. cookie
e. malware keywords
f. location url
g. cookie theft
h. document write via img/script tag.

The method further comprising operating a response module by:

passing user request to the response module, requesting to the cloud and emulates the response if it is html, requesting the embedding javascripts from the html page, and no requests for images or iframed src request.

Methods include catching patterns by detecting writing to a predetermined portion of the heap with executable code;

detecting attempt to point execution pointer to the vulnerable code on heap;

detecting creation of large number of objects by counting number of createElement in a given script and compare with a threshold;

detecting large memory write with unicode characters;

detecting fromCharCode( ) and unescape( ) functions;

detecting dynamically document write on the page;

checking the contents javascript about to dynamically write on the page and tracing if the iframe contents have been decoded before, if script tag or img tag, flag as document write; and checking contents of eval function which executes javascript code passed as a string argument for presence of the malicious keywords or large unicode strings for shellcode, vulnerable clsid etc.

An other method comprises maintaining a cookie jar with set-cookie header value and tracing the value returned from document.getCookie( ) function.

The method further comprises tracing the cookie value manipulation and store modified cookie in the cookiejar as well to identify the cookie theft in event.

There is no legitimate reason of appending a cookie to the URL. The normal request would provide the cookie to the site that owns the cookie as a request header. When the URI is not same domain as the origin domain of the cookie, appending that same value to strings that fit the URI pattern elicits the cookie theft flag on that URI.

The method further comprises, in a request module, checking incoming request and blocking if the domain matches url categorized in response module; and checking url if it contains a string that matches values in cookie jar, and domain is not same as the cookie domain, categorize as cookie theft.

A method embodiment for dynamically tracing frequently used javascript features to detect a uniform resource identifier provisioning a malicious javascript content in response to http requests comprises:

receiving a read request to a uniform resource locator (URL);

initializing a browser;

reading the requested URL;

loading a page comprising html and embedded javascript;

executing the javascript;

tracing execution of at least one frequently used javascript feature used to either redirect users to a website serving malicious contents or used to inject malicious javascript in html response, and categorizing vulnerabilities and storing the URL when malicious contents are found.

In an embodiment, when the frequently used javascript feature is one or more of fromCharCode( ) and unescape( ) whereby contents are decoded, the method comprises storing a vulnerability category 5.

In an embodiment, when the frequently used javascript feature is eval and its string argument comprises malicious keywords, the method comprises storing a vulnerability category 5.

In an embodiment, when the frequently used javascript feature is eval and its string argument includes large unicode strings, the method comprises storing a vulnerability category 5.

In an embodiment, when the string argument of javascript feature eval is the decoded content, the method further comprises storing a vulnerability category 5.

In an embodiment, when the frequently used javascript feature is CreateElement, the method further comprises counting the number of CreateElement instances in the javascript and comparing the number with a threshold, the method further comprises storing a vulnerability category 1.

In an embodiment, when the frequently used javascript feature is document.write and string argument is iframe, the method further comprises storing a vulnerability category 2.

In an embodiment, the method further comprises finding a <script> tag and further comprises storing a vulnerability category 9.

In an embodiment, the method further comprises finding an <image> tag and further comprises storing a vulnerability category 9.

In an embodiment, the method further comprises finding an iframe "src".

In an embodiment the method further comprises finding fromCharcode( ) and unescape( ) whereby the iframe contents have been decoded before document.write and the method further comprises storing a vulnerability category 3.

In an embodiment, when the frequently used javascript feature comprises large memory write with unicode characters; the method further comprises storing a vulnerability category 12.

An other method embodiment comprises
  maintaining a cookie jar with set-cookie header value;
  tracing a value returned from document.getCookie( )
  storing the URI as cookie theft content when the URI is not same domain as the origin domain of the cookie and
  further comprising storing a vulnerability category 4 and 8.

In an embodiment the method further comprises tracing the cookie value manipulation and storing the modified cookie into the cookie jar to identify the cookie theft event. In an embodiment the method further comprises that the client request is either SWF (Adobe Flash) or Portable Document Reader (pdf) and that Javascript is extracted and analyzed by the enhanced browser emulator and that malicious behavior is stored in vulnerability category 14.

Referring to FIG. 1, one aspect of the invention is a method for operating an apparatus which is a processor coupled communicatively to a network. The method configures the processor to perform the following steps: receiving files from websites and recording the origin website in the form or an Internet Protocol (IP) address or a fully qualified domain name (FQDN) 1; extracting script text from the files in an embodiment one of html, pdf, or flash which may contain instructions executable by a browser such as javascript 2; selecting script text which has been received from more than one origin which suggests that it is not authored or unique to a particular website 3; inserting one or more of the selected scripts into an otherwise inactive html file used only for the test 4; and within a browser which has instrumented library functions the instrumentation among other thing having flares or other indications that they are operating or recording the results of analysis of their operation, executing the html file which includes the selected script text 5. By flares we mean an additional output from selected functions that they have been invoked and executed, analysis of the inputs to the selected functions, the number of times each function has been invoked, and the cumulative result of executing the function.

Figure 2:
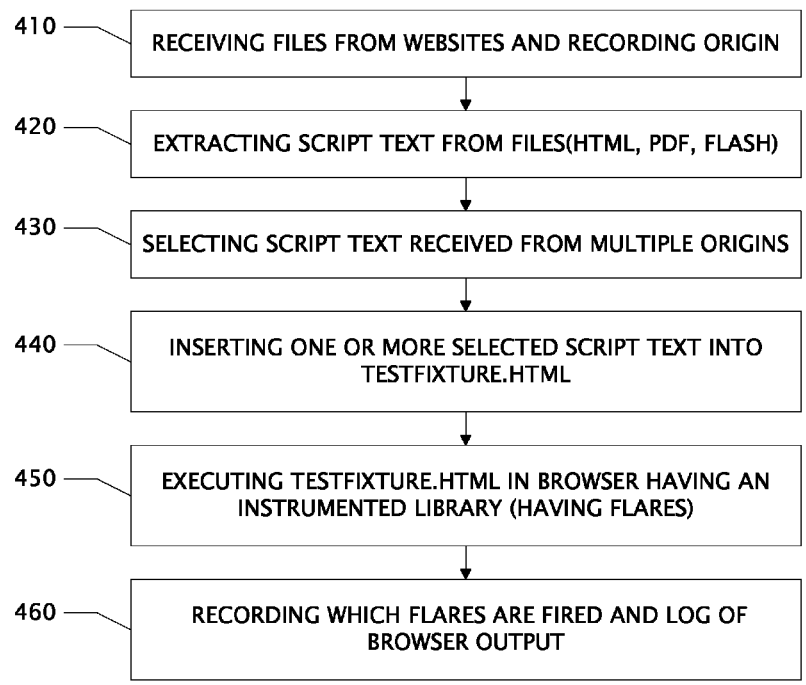
Figure 3:
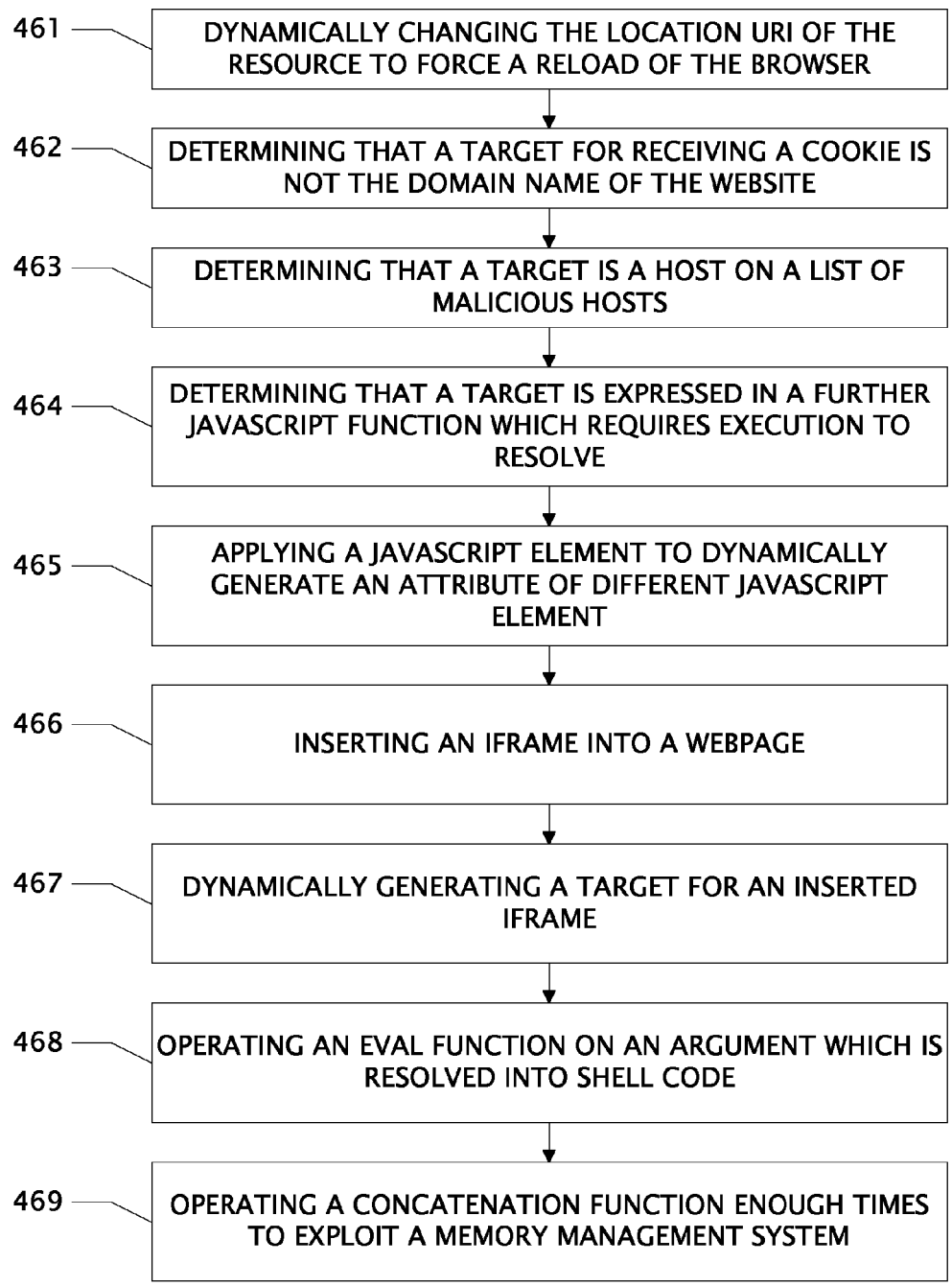

Referring now to FIG. 2, in an embodiment, a method further comprises recording the operation of selected library elements by recording which flares are fired and recording a log of the outputs of the browser during execution of the script text embedded in the html file 460. Referring now to FIG. 3, the method further comprises inter alia, determining from the patterns observed by recording the execution of scripts one or more of the following behaviors which suggest malicious behavior: dynamically changing the location URI of the resource (the web page) to force a reload of the browser 461; determining that a target (destination) for receiving a cookie is not the domain name of the website (who owns the cookie) 462; determining that a target is a host on a list of malicious hosts 463; determining that a target is expressed in a further javascript function which requires execution to resolve 464; applying a javascript element to dynamically generate an attribute of a different javascript element 465; inserting an iframe into webpage 466; dynamically generating a target for an inserted iframe 467; operating an eval function on an argument which is resolved into shell code 468; operating a concatenation function to build a string large enough to exploit a memory management system 469; and an equivalent function to modify within the browser, a destination for data transmission or cause an overflow to access an underlying processor access level of privilege.

Figure 4:
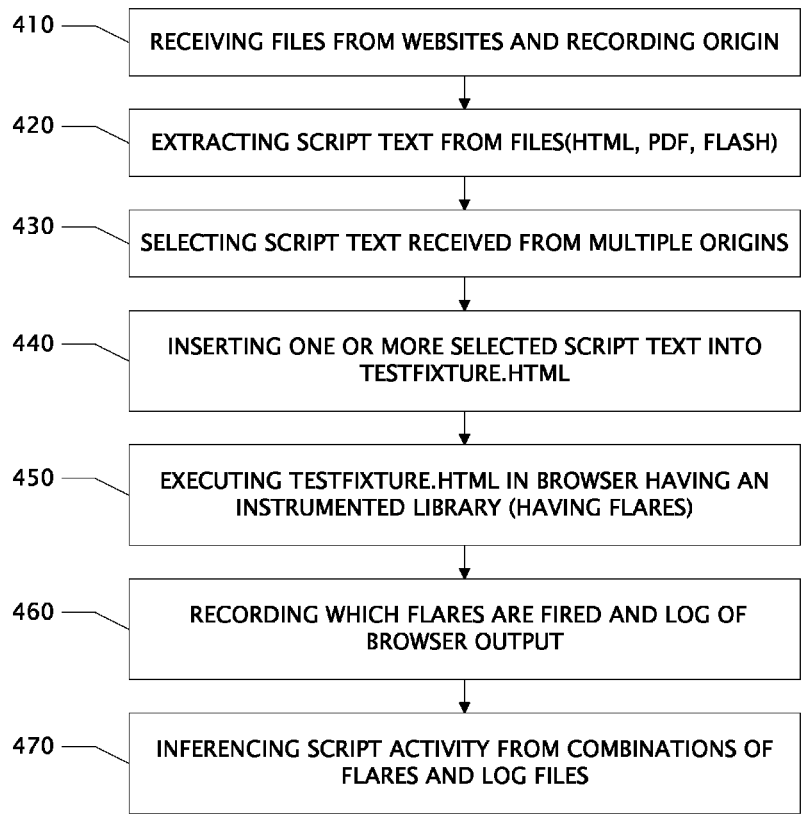

Referring now to FIG. 4, an embodiment of the method further comprises inferencing script activity from combinations of flares and log files 470.

Figure 5:
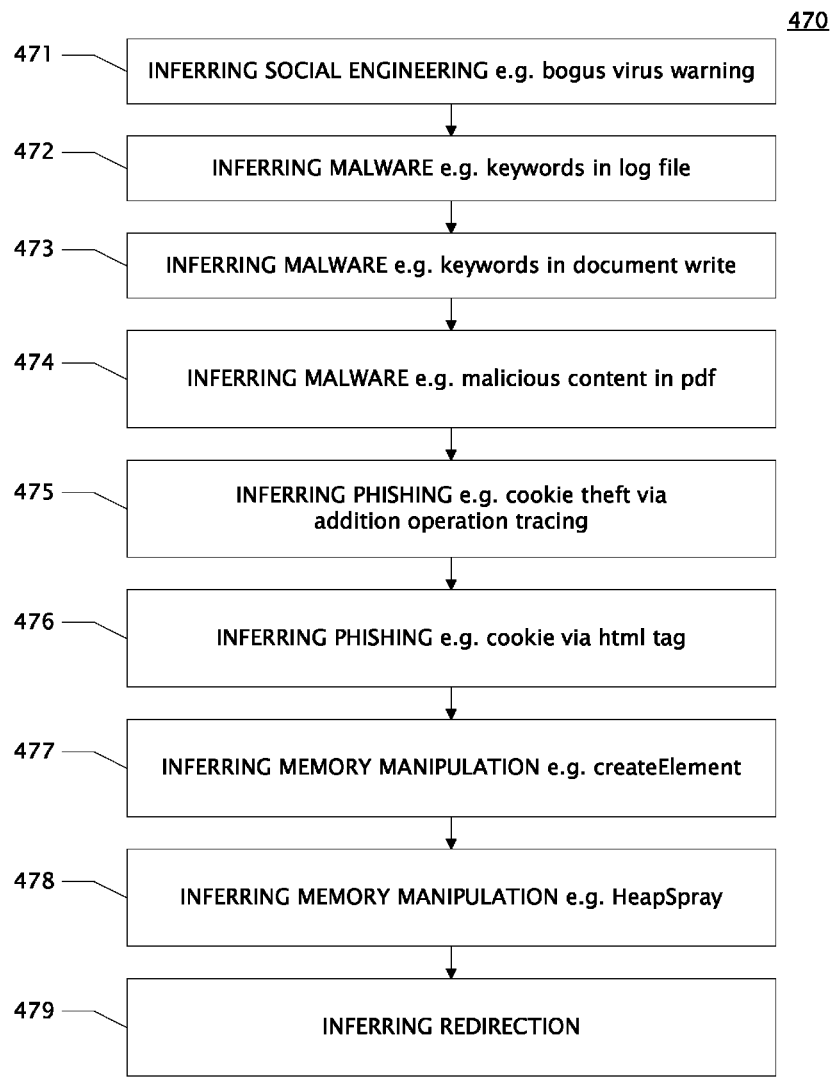

The method further comprises steps which infer script activity as illustrated in FIG. 5. Embodiments of inferencing malicious script behavior include inter alia: inferring social engineering such as by bogus virus warnings 471; inferring malware such as certain keywords found in the log file 472; inferring malware such as certain keywords as arguments to the document write function 473; inferring malware such as malicious content such as flash in pdf files 474; inferring phishing attacks such as cookie theft via addition operation tracing 475; inferring phishing attacks such as transferring a cookie via an html tag 476; inferring memory manipulation such as by unusual use of createElement function 477; inferring memory manipulation such by an attack described as HeapSpray 478; and any equivalent operation which can be inferred to cause redirection of the browser away from the original website 479.

Figure 6:
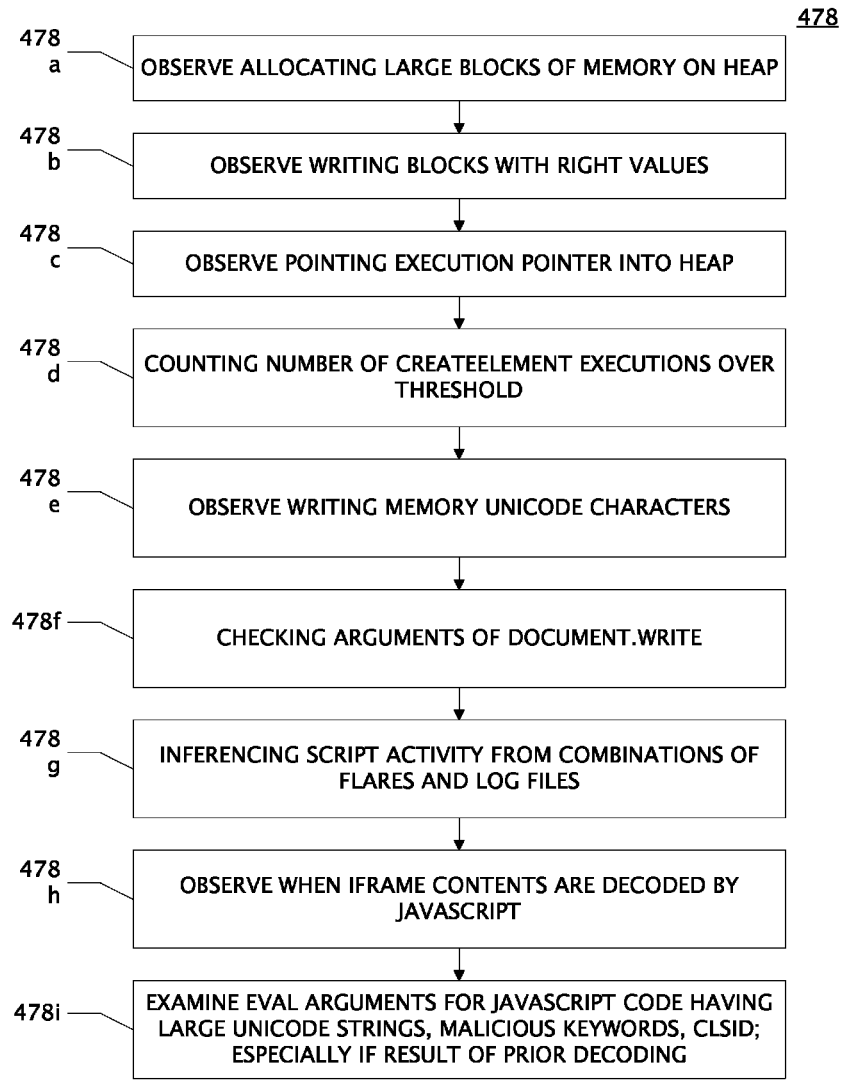

Referring now to FIG. 6, wherein heapspray attack 478*a-i* is described to include inter alia, some of the following: Heap Spray: This technique of attack tries to write a predetermined portion of the heap with executable code. This could be achieved by allocating large blocks on memory on heap and then writing the blocks with right values. The execution of memory is achieved by taking advantage of some vulnerability which would point execution pointer to the vulnerable code on heap.

One such attack creates large number of objects to exploit an opportunity. This could be simply caught by counting number of CreateElement executions and flag if the count is above threshold.

Second pattern: Large memory write with Unicode characters

Decoded/Deobfuscated contents: fromCharCode( ), unescape( ) functions are traced that are highly used by attackers today to decode contents at some point.

Document.write attacks: Check the contents javascript is about to dynamically write on the page. Heurisitics/pattern applied:

iframe 'src' should be pointing the domain other than origin (host) domain. This is rather common, such as in case "widget" like bookmarking appended on the page which are appended dynamically via javascript to iframe. We overcome this by tracing if the iframe contents have been decoded before which is a pretty good indicator of malicious contents.

However sometimes these write could be via <script> tag or <img> tag both of which load and pointed contents on page load event itself.

eval: check eval which is javascript evaluation function and executes javascript code passed as a string argument. These contents could be checked for presence of the malicious keywords, or large Unicode strings for shellcode, vulnerable clsid etc. In addition if these contents are decoded before, that gives a pretty good indication of the malicious contents.

Figure 7:
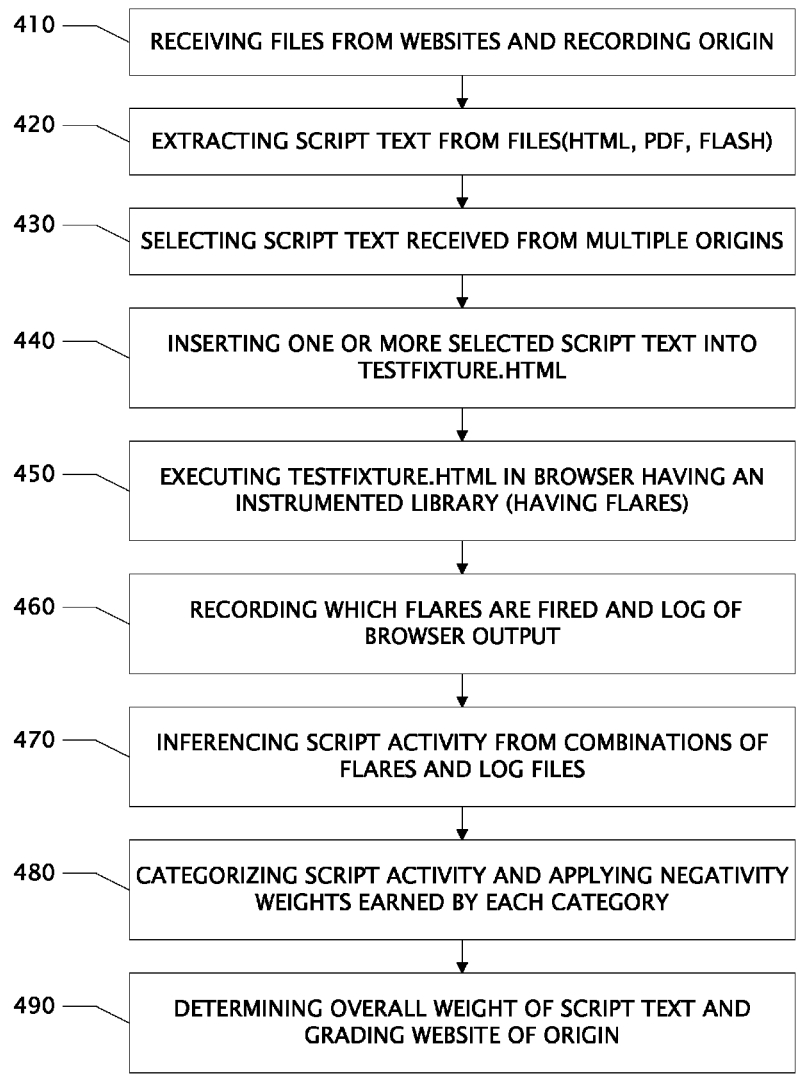

Referring now to FIG. 7, an embodiment of the method further comprises: categorizing script activity; applying negativity weights earned by each category 480; determining overall weight of script text; and grading website of origin 490.

Figure 8:
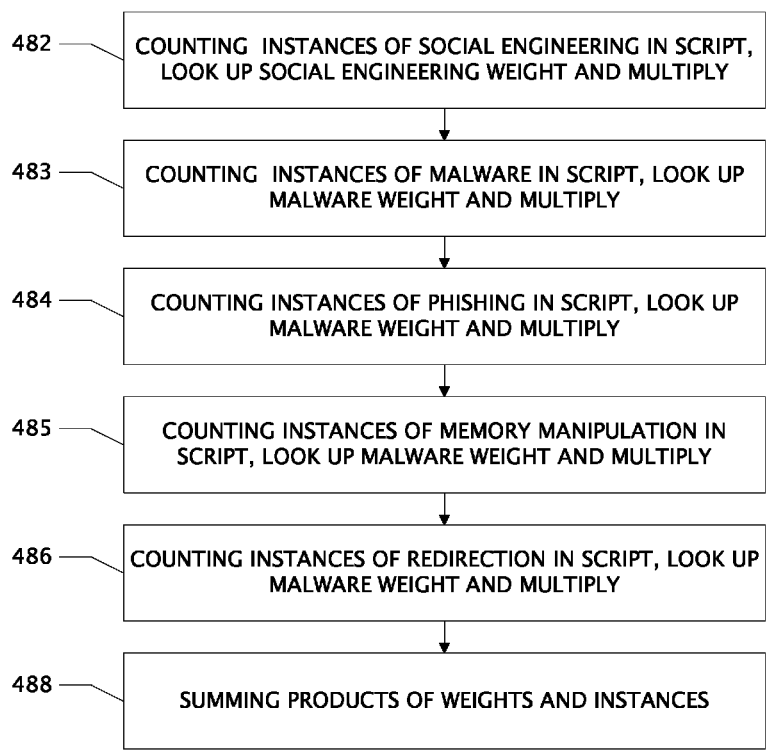

Referring now to FIG. 8, the method of categorizing active and applying weights 480 includes some or all of:
- counting instances of social engineering in script, looking up social engineering weight, and multiplying 482;
- counting instances of malware in script, looking up malware weight, and multiplying 483;
- counting instances of phishing in script, looking up phishing weight and multiplying 484;
- counting instances of memory manipulation in script, looking up memory manipulation weight and multiplying 485;
- counting instances of redirection in script, looking up redirection weight and multiplying 486; and
- summing products of weights multiplied by instances.

Figure 9:
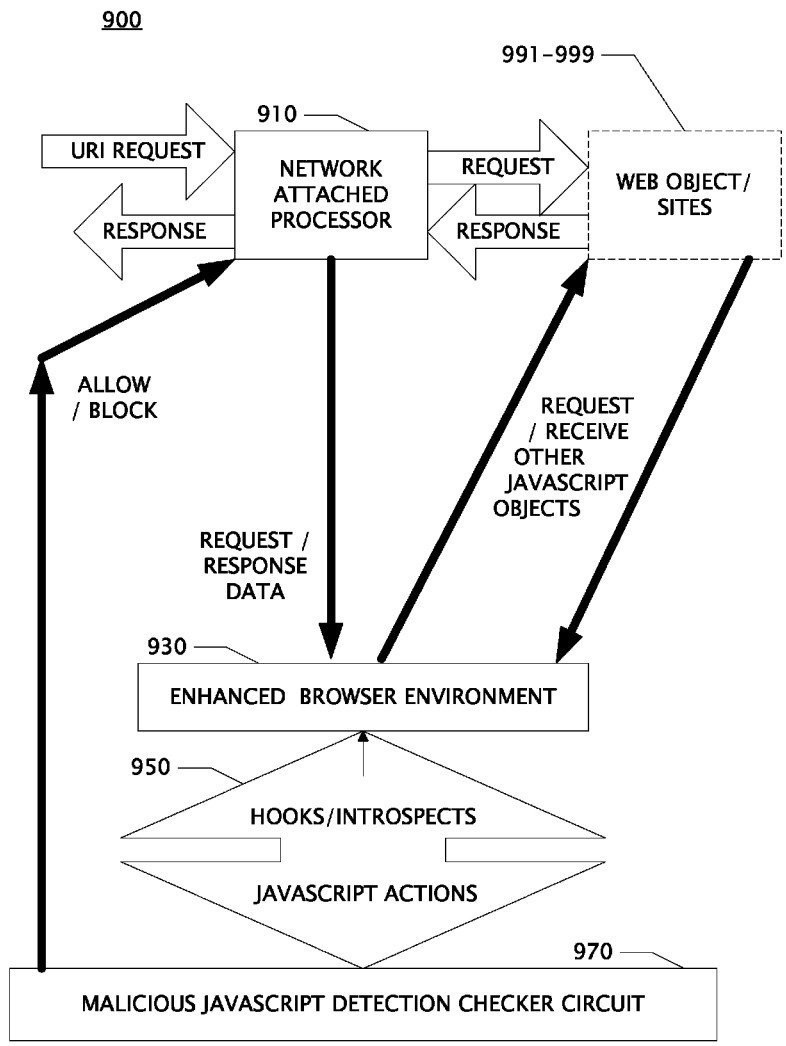
FIG. 9 is a block diagram of components of a system embodiment of one aspect of the invention as coupled apparatus.

Referring to FIG. 9, an exemplary embodiment system 900 is disclosed which has a network attached processor 910 intercepting and filtering a request for a Uniform Resource Identifier to at least one of a plurality of websites 991-999 and the response to the request. The network attached processor is coupled to an enhanced browser environment 930 to which it provides a file such as an html file containing text extracted from the response received from a website 991. In an embodiment, flash is extracted from the response. In an embodiment javascript is extracted from the response. A conventional browser environment executes all of the functions called by javascript silently. The apparatus embodiment of the invention has an enhanced browser environment 930 with instrumented functions which have a channel for hooks or introspects to monitor, analyze, and report javascript actions 950 in addition to performing the operations invoked by the attributes of the appropriate javascript element. The enhanced browser environment requests and receives other objects from the same or other websites according to the control of the initial javascript and other javascript that is requested by a predecssor javascript. A malicious javascript detection checker circuit 970 is communicatively coupled to the enhanced browser environment by said hooks/intercepts to monitor and score the javascript actions monitored, analyzed, and reported by channel 950. Depending on the negativity score assigned to the intercepted javascript actions, the response may be dropped or forwarded to the requestor of the URI.

MEANS, EMBODIMENTS, AND STRUCTURES

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also related to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a non-transitory computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. Within this application, references to a computer readable medium mean any of well-known non-transitory tangible media.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

CONCLUSION

The invention can be easily distinguished from solutions that observe effects on the hardware or software configuration of the host. The degree of obfuscation and the external sources or targets of network operations are important criteria for the scoring. There are no hashes of known malicious code being sought. The contents of the webpage, being obfuscated, do not easily match previously known hashes.

What is claimed is:

1. A method for scoring and grading websites by observing script behaviors in a browser emulator, comprising:
    providing one or more virtual machines on a computing system comprising a processor configured by an operating system;
    providing a communications link for each virtual machine to access hosts coupled to the Internet;
    within a virtual machine, providing an enhanced browser emulator application wherein said enhanced browser emulator is enhanced by replacing standard Application Programming Interfaces (APIs), libraries, and functions in a resource from a source website with instrumented operations, wherein the instrumented operations check the number of invocations of any of the APIs, libraries, and functions against a threshold and take action upon reaching the threshold;
receiving a Uniform Resource Identifier (URI) for the source website for which content is to be graded for hostile intent, wherein a URI comprises a protocol and a fully qualified domain name;
requesting by the browser a resource from said source website;
receiving said resource;
determining if shell code is contained within said resource from said source website;
determining if executable code is contained within said resource;
observing a behavior of the enhanced browser emulator as controlled by said executable code contained within the said resource and scoring said behaviors for hostile intent.

2. The method of claim 1 wherein
a behavior comprises:
dynamically changing the location URL of the resource to force a reload of the browser with content from a host not substantially similar to the domain name of the source website.

3. The method of claim 1 wherein
a behavior comprises:
attempting to get a cookie and transmit said cookie to a target other than the source website.

4. The method of claim 3 further comprising:
determining that said target is a host not substantially similar to the domain name of the source website.

5. The method of claim 3 further comprising:
determining that said target is a host on a list of malicious hosts.

6. The method of claim 3 further comprising:
determining that said target is expressed in a further javascript function which requires a browser execution to resolve.

7. The method of claim 1 wherein
the behavior comprises:
requiring a javascript element to dynamically generate an attribute of another javascript element.

8. The method of claim 1 wherein
the behavior comprises:
invoking a document write function to operate on an argument containing iframe src element value of which is substantially similar to a target wherein a target contains a domain name or an Internet Protocol (IP) address.

9. The method of claim 1 wherein
determining if executable code is contained within said resource comprises:
extracting executable code from a pdf file.

10. The method of claim 1 wherein
determining if executable code is contained within said resource comprises:
extracting executable code from a flash file.

11. The method of claim 1 wherein
the resource comprises a webpage, and
the behavior comprises:
inserting an iframe into the webpage.

12. The method of claim 11 wherein
the behavior further comprises:
dynamically generating a target for the iframe.

13. The method of claim 1 wherein
the behavior comprises:
operating an eval function on an argument which is resolved into shell code injection.

14. The method of claim 1 wherein
the behavior comprises:
operating a document write function on an argument which is resolved into shell code injection code.

15. The method of claim 1 wherein
the behavior comprises:
operating a createElements function enough times to exceed a threshold whereby memory manipulation can be exploited.

16. The method of claim 1 wherein
the behavior comprises:
operating a concatentation function to create a string large enough to exceed a threshold whereby memory can be exploited.

17. The method of claim 1 wherein
the behavior comprises:
operating a javascript sequence previously determined to be malicious.

18. The method of claim 1 further comprising:
determining a total score for a website from the scores of the behaviors of javascript within a browser emulator, and
determining a grade for the website by comparing the total score to one or more thresholds.

19. The method of claim 1 wherein
some of the instrumented operations examine attributes of the APIs, libraries, and functions and determine if any of the attributes require evaluation.

20. The method of claim 1 wherein
said enhanced browser comprises at least one enhanced script function which flags when it is invoked, writes details to a log and self analyzes the result of its execution.

* * * * *